United States Patent [19]

Lobmeyer et al.

[11] 4,400,937

[45] Aug. 30, 1983

[54] CONTROL FOR QUICKLY EFFECTING DISPLACEMENT CHANGES IN A PUMP SUPPLYING FLUID TO PRIMARY AND SECONDARY FUNCTION CONTROL VALVES

[75] Inventors: Raymond J. Lobmeyer, Hudson; James A. Miller, Cedar Falls, both of Iowa

[73] Assignee: Deere & Company, Moline, Ill.

[21] Appl. No.: 427,391

[22] Filed: Sep. 29, 1982

[51] Int. Cl.$^3$ .............................................. F16H 39/46

[52] U.S. Cl. .......................................... 60/422; 60/452; 417/218

[58] Field of Search ................. 60/421, 422, 430, 452; 417/218

[56] References Cited

U.S. PATENT DOCUMENTS

| | | | |
|---|---|---|---|
| 4,034,563 | 7/1977 | Orth | 60/422 |
| 4,044,786 | 8/1977 | Yip | 60/421 |
| 4,116,001 | 9/1978 | Orth | 60/422 |
| 4,292,805 | 10/1981 | Acheson | 60/452 |
| 4,293,284 | 10/1981 | Carlson et al. | 417/218 |

FOREIGN PATENT DOCUMENTS

| | | | |
|---|---|---|---|
| 2913534 | 10/1980 | Fed. Rep. of Germany | 417/218 |

*Primary Examiner*—A. Michael Chambers

[57] ABSTRACT

A hydraulic system includes a primary function control valve connected to the output of a highly responsive variable displacement pump and having a power-beyond port connected for supplying fluid to a secondary function control valve. The secondary function control valve has a power-beyond port connected to a displacement controller which is responsive to the flow for increasing or decreasing the displacement of the pump respectively in response to decreases and increases in power-beyond flow from the secondary function control valve. Provided for nullifying signals which would otherwise effect changes in the displacement of the pump when functions controlled by either the primary or secondary function control valves encounter sudden, momentary load changes is a pair of identical lead compensators in the form of stepped pistons arranged with the small ends thereof respectively in fluid communication with the primary control valve power-beyond flow and with the pump output and having the large ends thereof connected to the pump displacement controller.

3 Claims, 1 Drawing Figure

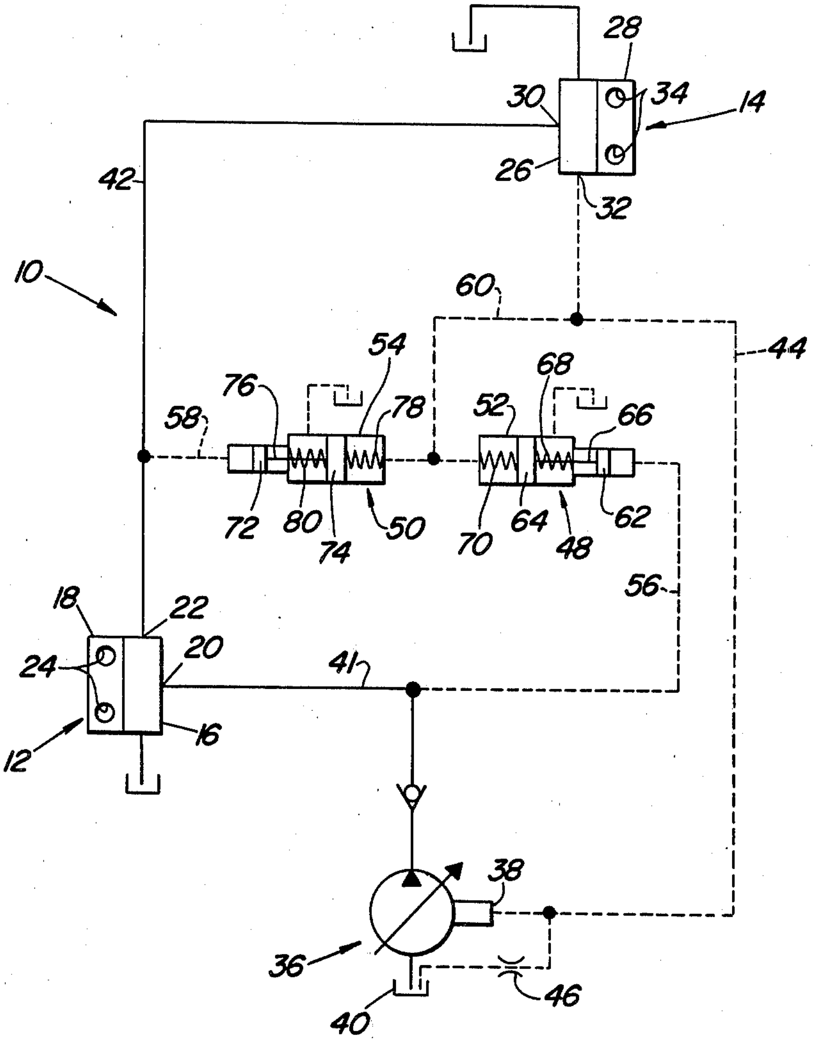
28
30
34
14
42
26
32
10
60
44
54
68
76
58
78
52
66
72
80
74
50
70
64
48
62
56
18
22
24
20
41
12
16
38
36
46
40

CONTROL FOR QUICKLY EFFECTING DISPLACEMENT CHANGES IN A PUMP SUPPLYING FLUID TO PRIMARY AND SECONDARY FUNCTION CONTROL VALVES

RELATED APPLICATION

The present invention is disclosed in co-pending U.S. patent application Ser. No. 161,082 filed on June 19, 1980 by the named applicants of the instant application.

BACKGROUND OF THE INVENTION

The present invention relates to hydraulic systems and more particularly relates to hydraulic systems including a highly responsive, variable displacement pump having its displacement controlled automatically and quickly in response to the requirement of various hydraulic functions as indicated by power beyond flow emanating from control valves for the various functions.

Power-beyond is a typical option available on most valves used in open center or constant flow hydraulic systems. With a plurality of control valves connected in series, this option gives the first control valve priority on the hydraulic flow available and when the flow is not used it is directed out the power-beyond port to the next valve rather than back to the hydraulic reservoir as is done with conventional open center valves.

The most common open center power-beyond valves use open center spools for function control. The spools are moved to restrict the flow through the open center passage causing a pressure increase to the load pressure. The flow is divided between the open center passage and the work ports with the open center flow being directed out the power-beyond port and the returning load flow being directed back to sump. Dividing flow in this manner makes it difficult for an operator to control the speed of a function since fluctuations in function load must be compensated for by spool movement.

This problem of control is somewhat alleviated by a more specialized type of open center, power-beyond valve which incorporates a pressure compensated flow control valve which operates to divide flow in response to the demand for fluid of a function controlled by the valve. Flow is related to spool movement with the flow being maintained constant for varying function loads and also being limited to a predetermined rate. Examples of pressure compensated, open center, power-beyond valves are found in U.S. Pat. No. 3,455,210 issued to Allen on July 15, 1969; U.S. Pat. No. 3,465,519 issued to McAlvay et al on Sept. 9, 1969; and U.S. Pat. No. 3,718,519 issued to Tennis on Feb. 27, 1973.

For the sake of efficiency, systems employing open center valves use variable displacement pumps which are automatically controlled in some way to meet the instantaneous demand of the systems. One example of a system employing a variable displacement pump controlled in this matter is disclosed in the aforementioned McAlvay et al. patent. Specifically, McAlvay et al disclose a system employing a single variable displacement pump, a multiplicity of functions and control valves therefor with the power-beyond flow from the last control valve being coupled to a pressure responsive displacement controller for decreasing the output of the pump in response to increasing power-beyond flow.

Ordinary pumps require a signal pressure of up to one second in order for their displacement to be changed. This time period is too long for efficient operation. However, highly responsive pumps which require a signal pressure duration of only 100 milliseconds for effecting displacement changes are so sensitive to system pressure changes not related to function demand, that they sometimes operate to cause erratic operation of the function.

SUMMARY OF THE INVENTION

According to the present invention, there is provided a novel hydraulic system incorporating control valves of the pressure-compensated, power-beyond type with a highly responsive variable displacement pump for supplying fluid to the valves having its displacement controlled in accordance with the power-beyond flows emanating from the control valves.

It is an object of the invention to provide a hydraulic system including a variable displacement pump having its displacement altered quickly to compensate for sudden high or low demands for fluid made by primary functions and to provide compensators for ensuring a stable system when the system experiences rapid pressure changes unrelated to function demand.

This and other objects will become apparent from a reading of the following description together with the appended drawing and are achieved by a hydraulic system constructed as set forth in the next paragraph.

The hydraulic system of the present invention includes a primary function control valve connected to the output of a highly responsive variable displacement pump and having a power-beyond port connected for supplying fluid to a secondary function control valve. The secondary function control valve has a power-beyond part connected to a displacement controller which is responsive to the flow for increasing or decreasing the displacement of the pump respectively in response to decreases and increases in power-beyond flow from the secondary function control valve. Provided for maintaining substantially constant displacement of the pump when the system undergoes abrupt pressure changes unrelated to function demands is a pair of lead compensators in the form of stepped pistons arranged with the small ends thereof respectively in fluid communication with the primary control valve power-beyond flow and with the pump output and having the large ends thereof connected to the pump displacement controller.

BRIEF DESCRIPTION OF THE DRAWING

The sole FIGURE is a schematic representation of a hydraulic system constructed in accordance with the principles of the present invention.

DESCRIPTION OF THE PREFERRED EMBODIMENT

Referring now to the drawing, therein is shown a hydraulic control system indicating in its entirety by the reference numeral 10. The hydraulic control system 10 incorporates a pair of control valves of the pressure compensated, power-beyond type and preferably these valves are of a compensated similar to that of the valve disclosed in the aforementioned U.S. Pat. No. 3,718,159 except that the control valves herein are shown as including only one function control section stacked together with an inlet section while the control valves disclosed in the patent include three function control sections stacked together with an inlet section.

Specifically, the control system 10 includes a primary function control valve 12 and a secondary function control valve 14, which are here shown in block form for simplicity.

The primary function control valve 12 comprises an inlet section 16 stacked together with a function or consumer control section 18. The inlet section 16 includes an inlet port 20 and a power-beyond port 22 and embodies a pressure compensated flow control valve (not shown) which divides the flow entering the inlet port between the power-beyond port and a passage leading to the function control section in accordance with the location of a control spool located in the function control section and the demand of a primary function being controlled. The function control section 18 includes a pair of service passages 24 which are respectively adapted for connection to the opposite ends of a double-acting hydraulic cylinder, for example.

Similarly, the secondary function control valve 14 includes an inlet section 26 stacked together with a function control section 28. The inlet section 26 includes an inlet port 30 and a power-beyond port 32. The function control section 28 includes a pair of service ports 34 which is also adapted for connection to the opposite ends of a double-acting hydraulic actuator.

Provided for supplying fluid to the control valves 12 and 14 is a highly responsive variable displacement hydraulic pump 36 having a pressure responsive displacement controller 38 associated therewith and operative to increase the displacement of the pump in response to receipt of a decreased pressure signal and vice versa. The pump 36 has an inlet connected to a sump 40 and an outlet connected to a supply conduit 41 extending to the inlet port 20 of the inlet section 16 of the primary function control valve 12. Connected between the power-beyond port 22 of the inlet section 16 and the inlet port 30 of the inlet section 26 of the secondary function control valve 14 is a conduit 42. A pilot fluid conduit 44 is coupled between the power-beyond port 32 and the displacement controller 38. The conduit 44 is also connected to the sump 40 by way of a branch thereof containing a flow restrictor 46 sized so as to maintain a predetermined minimum pressure at the displacement controller 38 for effecting a desired standby output from the pump 36.

In order that displacement be maintained approximately constant in the face of the system undergoing pressure changes unrelated to fluid demand of the primary and secondary functions respectively served by the valves 12 and 14, a pair of lead compensators 48 and 50 is connected in the circuitry leading to the valves 12 and 14 and to the displacement controller 38. Specifically, the lead compensators 48 and 50 respectively comprises stepped cylindrical chambers 52 and 54. The chamber 52 has a small end connected to the supply conduit 41 by a pilot fluid conduit 56 while the chamber 54 has a small end connected to the conduit 42 by a pilot fluid conduit 58. The chambers 52 and 54 have respective large ends connected to each other and to the pilot fluid conduit 44 by a pilot fluid conduit 60. Respectively reciprocably mounted in the small and large sections of the chamber 52 are small and large pistons 62 and 64, which are interconnected by a rod 66. A pair of centering springs 68 and 70 are located on opposite sides of the large piston 64 and bias it toward a centered position in the large section of the chamber 52. Similarly, the chamber 54 has small and large pistons 72 and 74 reciprocably mounted therein and interconnected by a rod 76. A pair of centering springs 78 and 80 are located on opposite sides of the large piston 74.

The lead compensators 48 and 50 operate as follows: Assuming that the spool (not shown) of the primary function control valve 12 has been shifted to actuate the primary function (not shown) controlled by the valve 12, the pressure compensated flow control valve (not shown) incorporated in the valve 12 will be operating to maintain a constant rate of flow, determined by the position of the spool of the valve 12, to the function with the remainder of the flow supplied by the pump 36 being routed to the power-beyond port 22. Assuming the secondary function control valve 14 to be in neutral, the power-beyond flow from the valve 12 will pass through the power-beyond port 32 of the valve 14 and will act on the controller 38 of the pump 36 to establish a certain displacement. If the load encountered by the primary function should then abruptly undergo a significant increase, the pressure compensated flow control valve incorporated in the valve 12 will respond to the increased load and try to maintain the preselected flow rate. This valve action will result in the flow to the power-beyond port 22 being decreased and in the absence of the lead compensators 48 and 50, this reduction of the pump 36. However, what happens is that the increase in pressure which results in the line 41 due to the load acts against the piston 62 of the lead compensator 48 and the piston 62 shifts leftwardly such that the piston 64 expels a quantity of fluid from the left end of the cylinder 52. This quantity of fluid makes up for the decrease in power-beyond flow effected by the pressure compensated flow control valve of the valve 12, and the controller 38 does not receive a changed pressure and, hence, the displacement of the pump 36 remains constant. On the other hand, if load on the primary function momentarily significantly decreases, the pressure compensated valve of the valve 12 will open further to divert more fluid to the power-beyond port 22. The pressure in the line 41 will then drop and the pistons 62 and 64 of the compensator 48 will shift rightwardly such that the cylinder 52 "absorbs" an amount of fluid equal to the increase routed to the power-beyond port 22. Again the controller 38 sees no change in pressure and the displacement of the pump 36 remains unchanged.

If the primary function control valve 12 is in neutral while the secondary function control valve 14 is operated to actuate a secondary function, then a sudden, sizable increase in load will result in the pressure compensated valve (not shown) of the valve 14 acting to decrease the flow through the power-beyond port 32. The pressure in the lines 41 and 42 will then increase, resulting in the pistons 62 and 64 of the compensator 48 shifting leftwardly and in the pistons 72 and 74 of the compensator 50 shifting rightwardly to expel respective quantities of fluid into the line 60 so as to compensate for the decrease in fluid passing through the power-beyond port 32. As before, no net change in pressure occurs at the controller 38 and the displacement of the pump 36 remains unchanged. On the other hand, a significant, short duration decrease in the load encountered by the secondary function will cause the pressure compensated valve of the control valve 14 to open to increase the flow passing through the power-beyond port 32. Concurrently, however, the pistons of the lead compensators 48 and 50 respectively shift rightwardly and leftwardly, in response to lower pressure then existing in the lines 41 and 42, to make room for absorbing the increased flow passing through the power-beyond port 32 so that no pressure change occurs in the line 44 for acting on the pump displacement controller 38.

Thus, it will be appreciated that the lead compensators 48 and 50 in effect act for measuring the pressure change rate in the lines 41 and 42 and respond to send a stabilizing signal to the pump controller. The pressure change rate and stabilizing signal could also be accomplished electrically by using a microprocessor coupled to known electrohydraulic pressure and flow-sensing apparatus and by utilizing a known pump displacement controller which operates in response to electrical signals.

We claim:

1. In a hydraulic system including a variable displacement pump, a pressure responsive displacement controller connected to the pump for decreasing the displacement thereof in response to receiving increasing signal pressure and vice versa, a primary function control valve including a supply inlet connected to the pump, service ports adapted for connection to a primary function and a primary function power-beyond port, at least one secondary function control valve including a supply inlet connected to the primary function power-beyond port, service ports adapted for connection to a secondary function and a secondary function power-beyond port connected to the displacement controller, the primary and secondary function control valves each including a pressure compensated divider for dividing flow between the respective power-beyond and service port of each valve when the latter is actuated, respectively in accordance with the fluid required by the primary and secondary functions, the improvement, comprising: lead compensating means connected to the primary function power-beyond port, to the displacement controller and to the pump for acting in response to sudden increases or decreases in the load encountered by the primary or secondary functions to generate a signal pressure for offsetting any signal pressure change resulting because of the sudden change in load, whereby the displacement of the pump remains unchanged.

2. The hydraulic system defined in claim 1 where said lead compensating means includes first and second identical lead compensators; said lead compensators each including a stepped piston with a small end of the first lead compensator being connected to the primary function power-beyond port, with a small end of the second lead compensator being connected to the pump and with a large end of each of the first and second lead compensators being connected to the displacement controller; and each of said lead compensators further including biasing means urging the piston thereof toward a centered position.

3. In a hydraulic system including a variable displacement pump including a controller responsive to increasing and decreasing signals for respectively effecting decreasing and increasing displacement, a primary function control valve including a supply inlet connected to the pump, service ports adapted for connection to a primary function and a primary function power-beyond port, at least one secondary function control valve including a supply inlet coupled to the primary function power-beyond port, service ports adapted for connection to a secondary function, and a secondary function power-beyond port connected to the displacement controller, the primary and secondary function control valves each including a pressure compensated flow control valve for dividing flow between the respective power-beyond and service ports of each primary and secondary function control valve when the latter are actuated, the improvement comprising: pressure change rate sensing means coupled to the respective supply inlets of said primary and secondary function control valves for determining the pressure change rate occurring there; said pressure change rate sensing means including means for generating a signal representing the pressure change rate sensed and for applying said signal to the displacement controller, whereby the generated signal offsets the signal received by the controller from the secondary function control valve power-beyond port.

* * * * *